(12) United States Patent
Shinoda

(10) Patent No.: US 10,774,864 B2
(45) Date of Patent: Sep. 15, 2020

(54) CLIP

(71) Applicant: NEWFREY LLC, New Britain, CT (US)

(72) Inventor: Yoshinori Shinoda, Utsunomiya (JP)

(73) Assignee: NEWFREY LLC, New Britian, CT (US)

( * ) Notice: Subject to any disclaimer, the term of this patent is extended or adjusted under 35 U.S.C. 154(b) by 259 days.

(21) Appl. No.: 15/946,869

(22) Filed: Apr. 6, 2018

(65) Prior Publication Data
US 2018/0291942 A1  Oct. 11, 2018

(51) Int. Cl.
*F16B 19/00* (2006.01)
*F16B 21/08* (2006.01)
*B60R 13/02* (2006.01)
*F16B 5/06* (2006.01)

(52) U.S. Cl.
CPC ........ *F16B 21/086* (2013.01); *B60R 13/0206* (2013.01); *F16B 5/0621* (2013.01)

(58) Field of Classification Search
CPC ............................ F16B 21/086; B60R 13/0206
USPC ............................................ 411/508; 24/297
See application file for complete search history.

(56) References Cited

U.S. PATENT DOCUMENTS

| 7,243,401 | B2 | 7/2007 | Sawatani | |
|---|---|---|---|---|
| 7,549,830 | B2* | 6/2009 | Cooley | F16B 21/086 24/297 |
| 8,333,540 | B2 | 12/2012 | Nakazato | |
| 8,613,128 | B2 | 12/2013 | Moerke et al. | |
| 8,806,722 | B2* | 8/2014 | Iwahara | F16B 21/086 24/297 |
| 8,936,420 | B2* | 1/2015 | Scroggie | F16B 5/065 411/45 |
| 10,018,214 | B2* | 7/2018 | Yon | B60R 13/02 |
| 2004/0181917 | A1* | 9/2004 | Sawatani | F16B 19/1081 24/297 |
| 2009/0252573 | A1* | 10/2009 | Nakazato | F16B 21/086 411/510 |

OTHER PUBLICATIONS

EP Search Report dated Sep. 13, 2018.

* cited by examiner

*Primary Examiner* — Gary W Estremsky
(74) *Attorney, Agent, or Firm* — Michael P. Leary; Kofi A. Schulterbrandt

(57) ABSTRACT

A clip comprises a member mounting portion for attaching a mounting member; an umbrella shaped flange; a flat plate-like shaft extending downward from the center of the umbrella flange; a pair of arms extending obliquely downward and outward from the umbrella center; a pair of legs extending from the upper outer side to the lower inner side; and a pair of locking portions near the upper end of each leg and having a distance between the outer surfaces smaller than the distance between the outer surfaces of the upper ends of the legs. The distal end of each arm is connected to the middle of a leg. A leg connector connects the lower ends of the legs to each other. As the clip is pushed into the mounting hole, the upper portions of the legs move inward and the lower portions of the legs move outward.

15 Claims, 9 Drawing Sheets

CLIP

CROSS-REFERENCE TO RELATED APPLICATION

This application claims priority from Japanese Patent Application No. 2017-075680, filed on Apr. 6, 2017, the entire disclosure of which is incorporated herein by reference.

BACKGROUND OF THE INVENTION

The present invention relates to a clip used for mounting an interior component such as a spoiler, a molding, a trim or the like to a member to be mounted, such as a panel of an automobile. In particular, it relates to a clip which can be mounted with no problem from the side opposite the punched and perforated portion on the mount receiving member.

Generally, a clip is used to attach a mounting portion such as a spoiler, a molding, a trim or the like to a member to be mounted, such as a panel of an automobile. Many such clips have been traditionally provided, and the shapes of the legs thereof varied. The overall shape of the clip depends on the type and shape of the mounting member to be mounted; the shape of the legs also varies.

A clip for mounting a mounting portion such as a trim or the like to a mounting hole of a mount receiving member, such as a body panel or the like, is equipped with a leg portion to be inserted into the mounting hole; the leg portion is equipped with a support column, and an elastic claw protruding to both sides from the tip portion side of the support column. The leg portion is inserted into the mounting hole of the mount receiving member, and the elastic claw is engaged with and mounted to the periphery of the mounting hole on the back side of the mount receiving member.

When detaching the mounting portion from the mount receiving member, the leg portion is pressed inward so that the outer diameter of the leg portion becomes small, a pullout force is applied exceeding the holding force to the leg portion, and the engagement of the elastic claw is moved outward from the periphery of the mounting hole to remove the leg from the mounting hole.

In many cases, burrs are formed in parallel to the axial direction on the side opposite the punched side in the periphery of the mounting hole punched and perforated on the mount receiving member in order to attach the clip.

Normally, the clip is mounted from the same side as the punched side to the mounting hole punched and perforated in the mount receiving member (the regular punch side). Normally, the distal end of the leg of the clip is thinner so that the distal end of the narrowed leg does not touch the burr, and the clip can be mounted normally.

However, when mounting a clip to a mount receiving member that is decorated on both sides of the back door of an automobile or the like, in some cases, a clip is mounted to the mounting hole of the mount receiving member from the side opposite the punched side (the reverse punch side). If a clip is mounted to the mounting hole from the reverse punch side, the burr protruding in the axial direction from the periphery of the mounting hole bites into the root side of the thickened leg portion of the clip, so that in some cases, it is impossible to carry out correctly assembly thereof, and a significant load is required in assembly. Furthermore, after mounting of the clip, it is difficult to obtain a strong removal force, and, in some cases, it may easily come off.

Patent Document 1, published Japanese application JP2013-509556, discloses a fastener (clip) equipped with a head, a flexible fixed blade (a retainer wing) connected to the head, and a guide ring that is slidable along the fixed blade. A guide slot is formed in the fixed blade, and the guide ring has a follower arm that is slidable along the guide slot. As the fastener is inserted into the hole (mounting hole) of the component (mount receiving member), the guide ring slides along the fixed blade and deflects the fixed blade inward.

The fastener of Patent Document 1 not only provides a strong holding force, but it also reduces the insertion force.

Since the fastener of Patent Document 1 has a guide ring, even when fasteners are mounted from the opposite side of the location punched in the mounting hole, the insertion load is reduced, and assembly is expected to be easy to carry out.

However, this fastener consists of two portions. One concern is that, prior to mounting the fastener to the component portions, the guide ring may come off the fastener due to vibration or contact with another portion. It is therefore necessary to pay attention to transport of the fastener, as well as handling during storage.

Patent Document 2, published Japanese application JP2012-112464, discloses a clip mounted to a mating member by inserting an anchor (leg) into a mounting hole penetrating the mating member (mount receiving member). The anchor is equipped with at least one pair of struts which are divided along the axis and can be tilted in a mutually crossing direction and elastic claws individually coupled to these struts. By inserting the anchor into the mounting hole of the mating member and engaging the elastic claw around the edge of the mounting hole, force for holding the anchor against the mating member can be obtained.

In mounting the clip, when inserting the anchor into the mounting hole of the mating member, the elastic claw of the anchor passes through the mounting hole while being deflected in the inward direction, with the joining portion that joins with the support acting as a fulcrum, and the engagement surface of the elastic claw engages the periphery of the mounting hole. In detaching the clip, when an extraction force exceeding the specified value is applied to the anchor, the anchor is tilted so that the two struts cross each other without contacting each other. As a result, the elastic claws are disengaged from the periphery of the mounting hole, and the anchor can be pulled out.

With the clip of Patent Document 2, both elastic claws are not scraped off by the edge of the mounting hole, and the anchor's holding force is maintained even if the clip is used repeatedly.

The clip of Patent Document 2 tilts so that when an extracting force exceeding the holding force is applied to the anchor, the two struts cross each other without contacting each other. With this structure, although it is possible to withdraw the anchor without difficulty, it is difficult to obtain a high extraction force, and the holding force needed cannot be obtained; these are problematic issues.

Further, in the case of mounting the clip from the side opposite the side punched into the mounting hole, it is expected that it will be difficult to assemble the clip of Patent Document 2 due to burrs, similar to the problem experienced with a normal clip.

For this reason, in order to mount interior portions such as spoilers, moldings, trim and the like to a mount receiving member such as the panel of an automobile, a clip has been sought wherein, even when mounting the clip from the side opposite where the mounting hole has been punched in the mount receiving member, the clip that can be reliably mounted without being influenced by the burr of the mounting hole.

Furthermore, a clip has been sought that has high removal force after mounting, and that exhibits sufficient holding force.

Patent Reference 1—[Patent Document 1] Published Japanese Translation of PCT International Application No. 2013-509556

Patent Reference 2—[Patent Document 2] Japanese Unexamined Patent Application Publication No. 2012-112464

BRIEF SUMMARY OF THE INVENTION

Accordingly, the object of the present invention is to provide a clip that can be reliably mounted without being affected by burrs even when mounting a clip from the side opposite where the mounting hole is punched in the mount receiving member.

In addition, another object of the present invention is to provide a clip wherein, after being mounted, the extracting force is high, and a sufficient holding force can be obtained.

To achieve these objects, the legs of the clip of the present invention can move outwardly and inwardly, with the point of connection with the umbrella flange acting as a fulcrum. The distal end of the arm supports the central portion of the leg, and the upper and lower portions of the leg can move outward and inward with the tip of the arm acting as a fulcrum.

A clip for mounting a mounting member to a mount receiving member having a mounting hole, the clip equipped with a member mounting portion to which the mounting member is mounted; an umbrella-shaped flange for pressing the mount receiving member; a pair of arm portions extending obliquely downward and outward from a central portion of the umbrella shaped flange; a pair of leg portions extending from the distal end portions of the pair of arm portions upward and outward and downward and inward; and a pair of locking stepped portions formed at the upper end portions of the pair of leg portions.

When equipped with a pair of arm portions extending obliquely downward and outward from a central portion of the umbrella shaped flange, and a pair of leg portions extending from the distal end portions of the pair of arm portions upward and outward and downward and inward, the pair of arm portions are deflected, and each leg portion can flex in the opposite direction with the upper portion and the lower portion acting as a fulcrum at the center portion connected to the tip portion of each arm portion.

Furthermore, it is preferable to equip a flat shaft portion extending downward from the central portion of the umbrella flange.

The clip, equipped with the shaft extending downward from the central portion of the umbrella flange, is reinforced along the central axis.

It is preferable to equip a leg connecting portion connecting the lower end portions of the pair of leg portions.

When the leg connecting portion connecting the lower end portion of the leg portion is equipped, the lower end portion of the leg portion is held so as not to spread excessively outward.

It is preferable for the leg connecting portion to have a pair of longitudinal portions, and a curved portion connecting the upper end portions of the pair of longitudinal portions.

If the leg connecting portion has a pair of longitudinal portions and a curved portion joining the upper end portions of the pair of longitudinal portions, the lower end portion of the leg portion can move to the inside and the outside to some extent.

It is preferable for the leg connecting portion to have a connecting portion thick portion [sic] thicker than the longitudinal portions and the curved portion between the pair of longitudinal portions and the curved portion.

When the leg connecting portion has a connecting portion thick portion thicker than the longitudinal portions and the curved portion between the longitudinal portions and the curved portion, if the lower portions of the leg portions try to approach each other, the connecting portion thick portion comes into contact with the lower portion of the leg portion, and the lower portion of the leg portion is controlled so as not to move excessively inward.

It is preferable that the pair of arm portions have an arm thick portion thicker than the other portions in the intermediate portion.

If the arm portions have an arm thick portion thicker than the other portions in the intermediate portion, when the clip moves to a great degree in the lateral direction from the center axis, the arm thick portion comes into contact with the shaft portion and controls the deviation of the clip.

It is preferable for the member mounting portion to have a head portion, a neck portion positioned below the head portion and having an outer diameter smaller than the head portion, and a mounting flange positioned below the neck portion and having an outer diameter larger than that of the neck portion.

If the member mounting portion has a head portion, a neck portion and a mounting flange, the clip can be mounted to the mounting member.

A second aspect of the present invention is a mounting structure wherein a mounting member is mounted to a mount receiving member having a mounting hole by a clip, equipped with the following: a member mounting portion for mounting the mounting member; an umbrella-shaped flange for pressing the mount receiving member; a pair of arm portions extending obliquely downward and outward from a central portion of the umbrella shaped flange; a pair of leg portions extending from an upper outer side to a lower inner side; and a pair of locking stepped portions on the upper end portions of the pair of leg portions; wherein the distal end portions of the pair of arm portions are respectively connected to intermediate portions of the pair of leg portions, the pair of locking stepped portions are positioned at a lower side edge portion of the mounting hole of the mount receiving member, and the mount receiving member is mounted between the outer peripheral portion of the umbrella shaped flange and the pair of locking stepped portions of the pair of leg portions.

It is preferable for the clip to include a shaft portion extending downward from a central portion of the umbrella flange.

It is preferable to equip a leg connecting portion connecting the lower end portions of the pair of leg portions.

According to the present invention, it is possible to provide a clip that can be reliably mounted without being influenced by burrs, even when a clip is mounted from the side opposite the side where the mounting hole is punched in the mount receiving member.

In addition, it is possible to provide a clip that has high extraction force and that can obtain sufficient holding force.

DETAILED DESCRIPTION OF THE PREFERRED EMBODIMENTS

Figure 1:
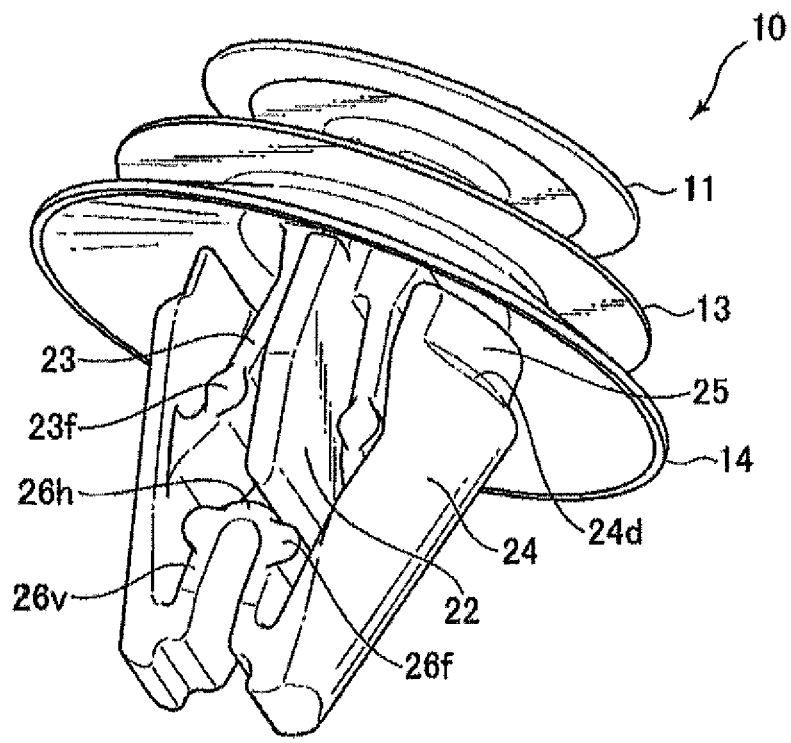
FIG. 1 is a perspective view of a clip according to an embodiment of the present invention.
Figure 2:
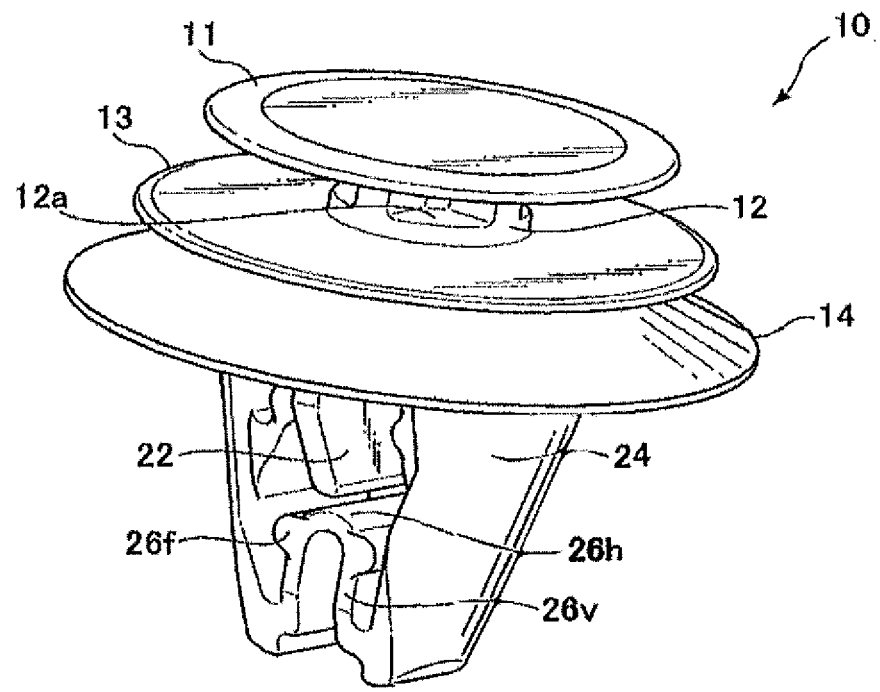
FIG. 2 is a perspective view of the clip of FIG. 1 viewed from another direction.
Figure 3:
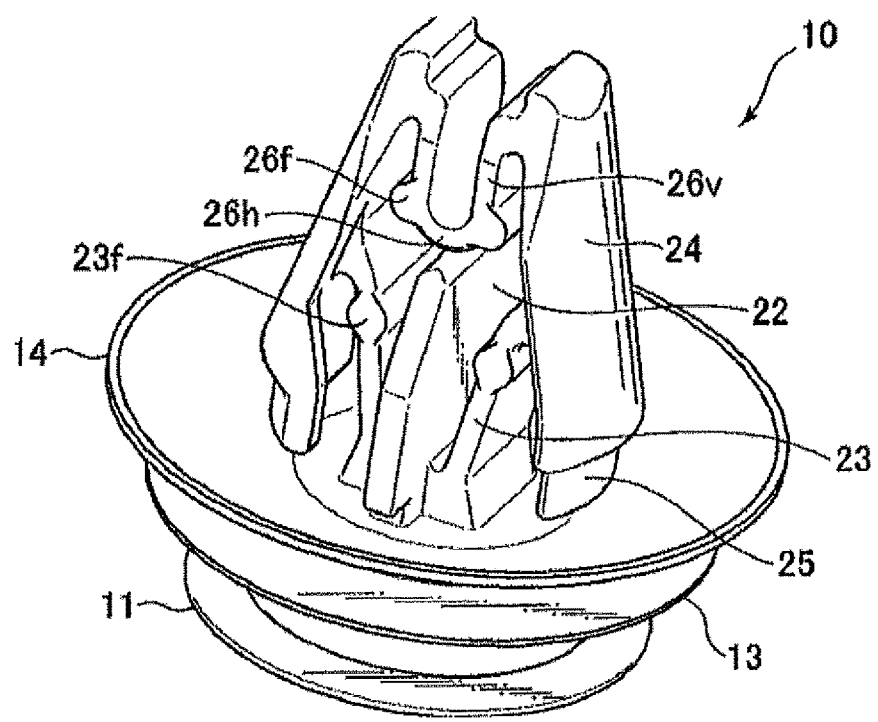
FIG. 3 is a perspective view of the clip of FIG. 1 as viewed from yet another direction.
Figure 4:
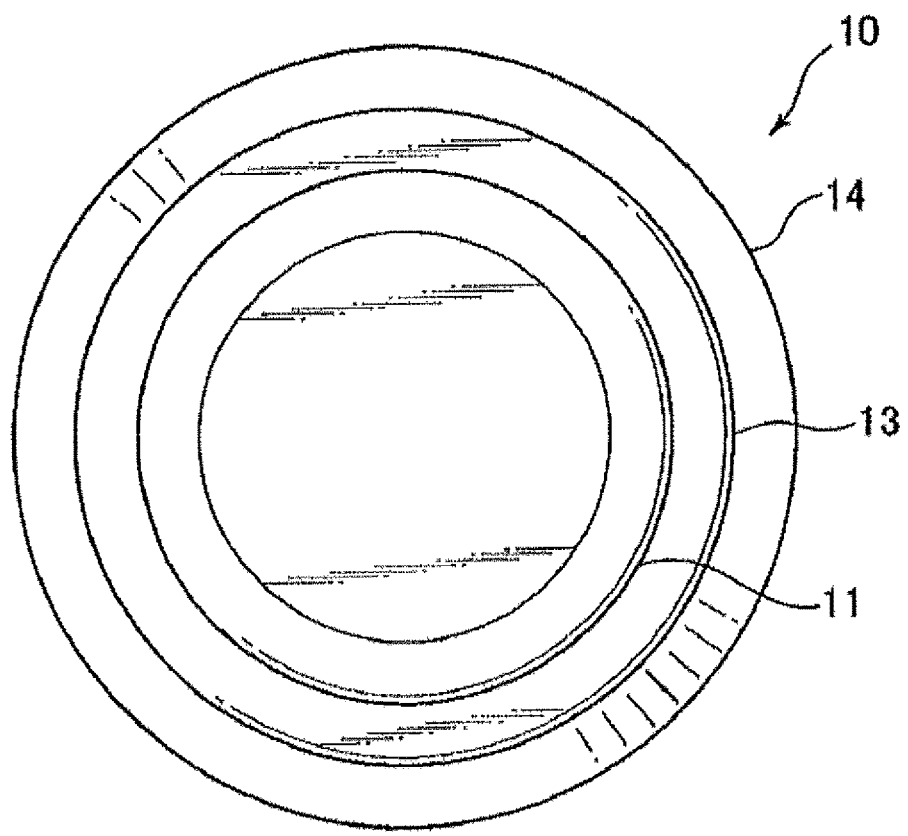
FIG. 4 is a top view of the clip of FIG. 1.
Figure 5:
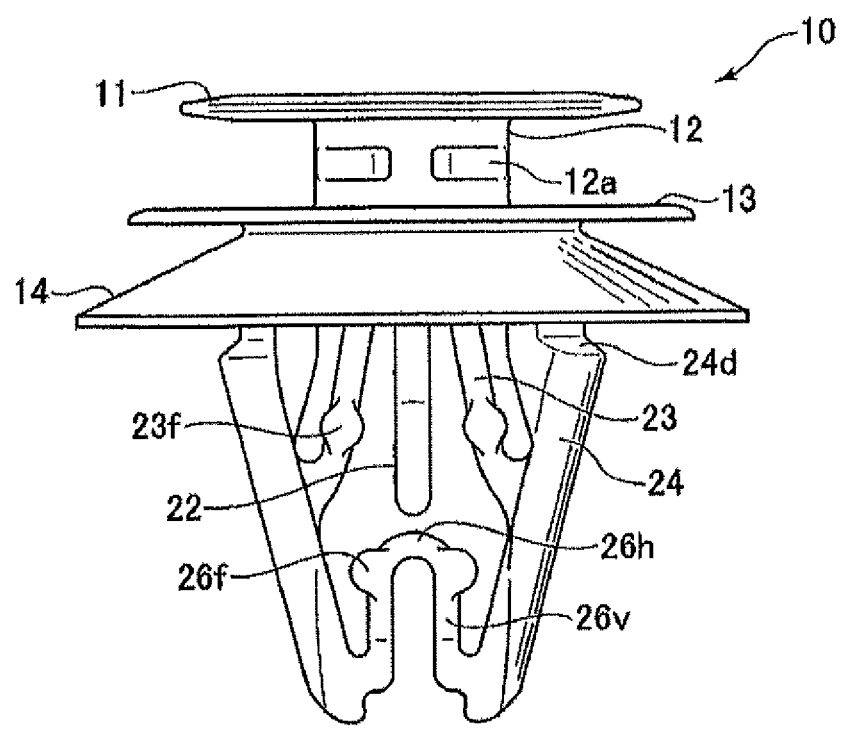
FIG. 5 is a front view of the clip of FIG. 1.
Figure 6:
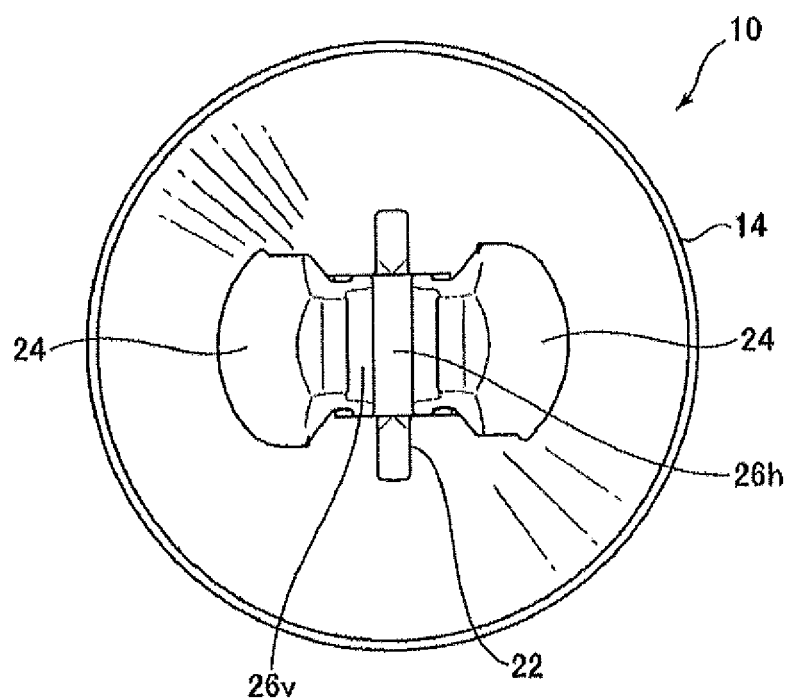
FIG. 6 is a bottom view of the clip of FIG. 1.
Figure 7:
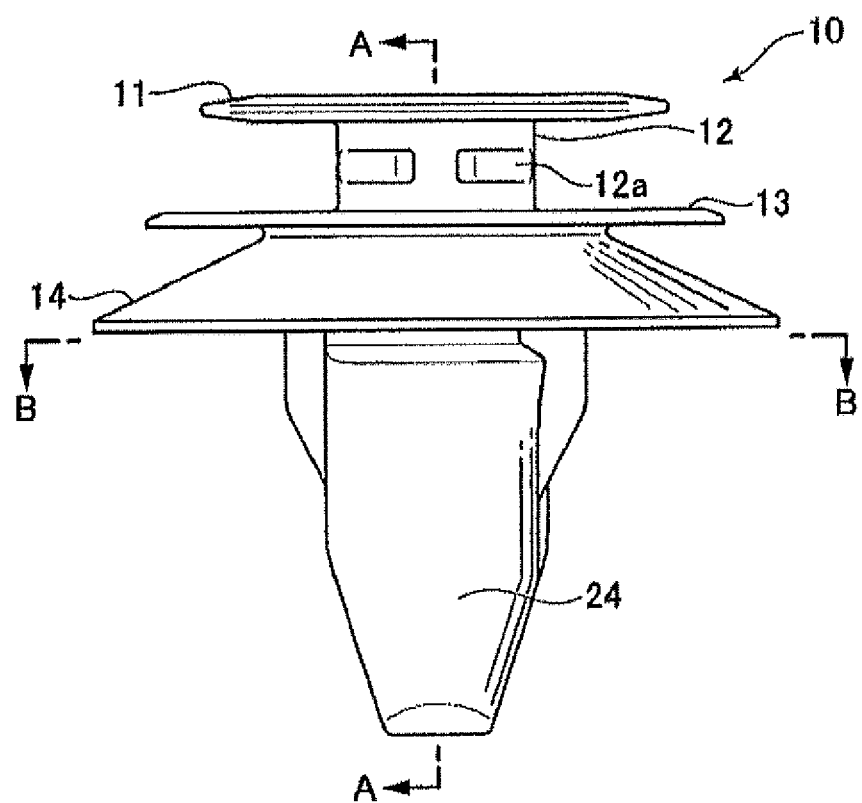
FIG. 7 is a right-side view of the clip of FIG. 1.
Figure 8:
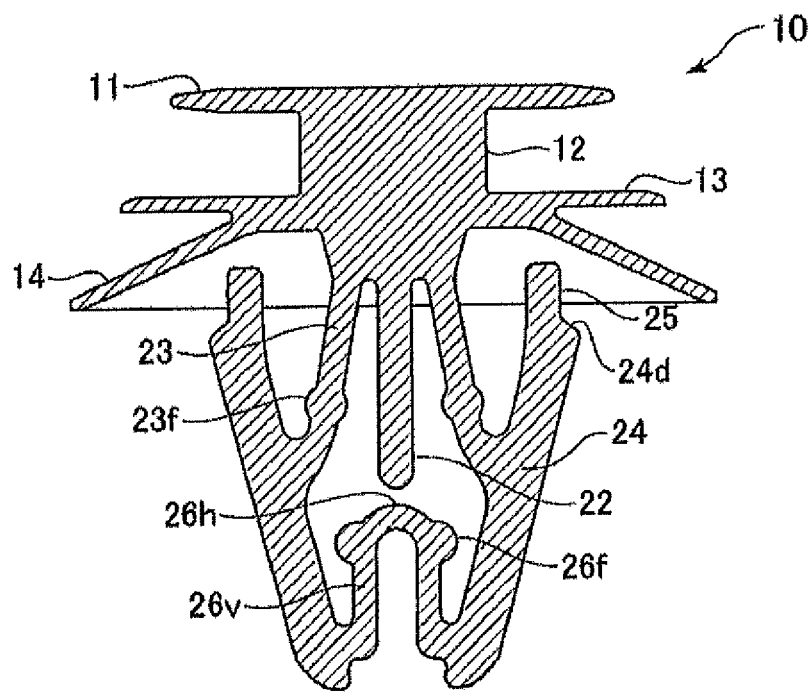
FIG. 8 is a cross-sectional view of the clip of FIG. 1 taken along line A-A in FIG. 7.
Figure 9:
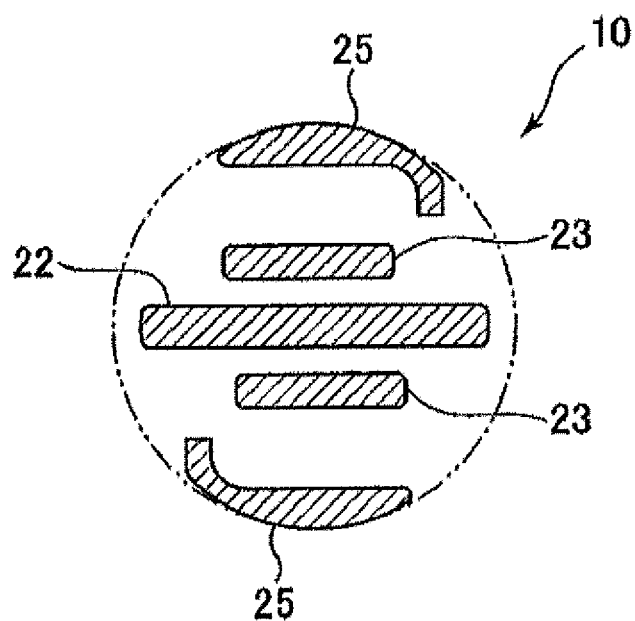
FIG. 9 is a cross-sectional view of the clip of FIG. 1 taken along line B-B in FIG. 7.

Hereinafter, embodiments of the present invention will be described with reference to the drawings. FIG. 1 is a perspective view of a clip 10 according to an embodiment of the present invention. FIG. 2 is a perspective view of the clip 10 viewed from another direction. FIG. 3 is a perspective view as viewed from yet another direction. FIG. 4 is a top view, FIG. 5 is a front view, FIG. 6 is a bottom view, and FIG. 7 is a right-side view of the clip 10. FIG. 8 is a cross-sectional view taken along line A-A, and FIG. 9 is a cross-sectional view taken along line B-B, of the clip 10 of FIG. 7.

Clip 10 has a member mounting portion including a head portion 11, a neck portion 12, and a mounting flange 13 for mounting to the mounting member 51 on the top portion. As shown in FIG. 2, the head portion 11 has a thin disk shape, and the circumference portion is slightly thin. The upper surface and the lower surface of the head portion 11 are flat.

Below the head 11 is the neck portion 12. The neck portion 12 has a short cylindrical shape. The outer diameter of the neck portion 12 is smaller than the outer shape of the head portion 11. As shown in FIGS. 2 and 5, a concave portion 12a is formed in the center portion in the vertical direction of the neck portion 12, and a cross-shaped portion is caused to remain in the cross section. Thus, the neck portion 12 has been reduced in weight.

Below the neck portion 12 is a substantially disc-shaped mounting flange 13. The upper surface and the lower surface of the mounting flange 13 are flat. The outer diameter of the mounting flange 13 is larger than the outer diameter of the head portion 11. The outer diameter of the mounting flange 13 can be appropriately set. When mounting the clip 10 to the mounting member 51, the mounting member 51 is sandwiched between the head portion 11 and the mounting flange 13.

The head portion 11, the neck portion 12 and the mounting flange 13 of the clip 10 are portions for mounting the mounting member 51; depending on the shape of the mounting hole 52 or the like of the mounting member 51, the shape of the head portion 11, the neck portion 12 and the mounting flange 13 can be appropriately changed.

Below the mounting flange 13 is an umbrella flange 14. The umbrella shaped flange 14 extends in the circumferential direction below the mounting flange 13 and extends obliquely downward in an umbrella shape from near the inner peripheral portion of the mounting flange 13. As shown in FIG. 8, the thickness of the umbrella-shaped flange 14 is substantially constant from the portion branching from the mounting flange 13 to the outer peripheral portion. The outer diameter of the umbrella-shaped flange 14 is larger than the outer diameter of the mounting flange 13. The outer diameter of the umbrella-shaped flange 14 can be appropriately set.

When mounting the clip 10 to the mount receiving member 50, the outer peripheral portion of the umbrella-shaped flange 14 abuts the upper surface of the mount receiving member 50 and bends to press the mount receiving member 50 from above.

Below the center portion of the umbrella-shaped flange 14, a flat plate-shaped shaft portion 22 extends downward. As shown in FIG. 9, the shaft portion 22 is thin in the lateral direction and has a fixed length in the width direction and the vertical direction. The length in the width direction of the shaft portion 22 is shorter than the inner diameter of the mounting hole 52 of the mount receiving member 50.

Below the central portion of the umbrella-shaped flange 14, a pair of arm portions 23 extend obliquely downward in the lateral direction on the lateral outside of the shaft portion 22. The arm portion 23 has a flat plate shape and has a certain length in the width direction. As shown in FIG. 9, the cross section of the arm portion 23 is rectangular.

The width direction length of the arm portion 23 is shorter than the width direction length of the shaft portion 22. The vertical length of the arm portion 23 is slightly shorter than the vertical length of the shaft portion 22.

At the lower portion of each arm portion 23, an arm portion thick portion 23f having a circular cross section is formed. The arm portion thick portion 23f extends in the width direction with a constant cross section.

When inserting the clip 10 into the mounting hole 52 of the mount receiving member 50, or when pulling out from the mounting hole 52, the clip 10 may be skewed in the lateral direction. In such case, the arm portion thick portion 23f is brought into contact with the shaft portion 22, and the clip 10 is regulated so as not to be greatly skewed in the lateral direction. Each arm portion 23 curves outward in the lateral direction at the tip of the arm portion thick portion 23f, and the tip portion of the arm portion 23 is connected to the central portion of the leg portion 24.

From the distal end portions of the respective arm portions 23, the leg portions 24 extend obliquely in an upward outward direction and a downward inward direction. A pair of legs 24 is equipped. As shown in FIGS. 3 and 9, the cross-sectional surface of the outer surface of the pair of leg portions 24 and the pair of locking portions 25 are arc-shaped.

When the arcs of the cross sections of the outer surfaces of the pair of leg portions 24 and the pair of locking portions 25 are extended, they are circular, as shown by the dashed-dotted chain line in FIG. 9.

The pair of leg portions 24 are thin at the lower end and smaller than the inner diameter of the mounting hole 52.

The pair of leg portions are thick at the upper rear end, and larger than the inner diameter of the mounting hole 52. With the pair of leg portions 24, the outer diameter of the central portion is equal to the inner diameter of the mounting hole 52.

The distance between the pair of leg portions 24 is small at the lower end portion, and the distance between the upper end portions is great. The inner surfaces of the pair of leg portions 24 are flat surfaces extending obliquely in the vertical direction and the width direction.

The distal end portion of the arm portion 23 is connected to the intermediate portion between the distal end portion and the rear end portion of the leg portion 24. The upper end of the rear end portion is a locking stepped portion 24$d$ with steps. The upper portion of the locking stepped portion 24$d$ is thin in the lateral direction to form a locking portion 25. The outer surface of the locking portion 25 is curved in an arc shape so as to conform to the inner diameter of the mounting hole 52 of the mount receiving member 50.

The vicinity of the distal end portions of the pair of leg portions 24 is connected by a leg connecting portion 26. The leg connecting portion 26 has a pair of longitudinal portions 26$v$ extending upward from near the distal end portion of the leg portions 24. Each longitudinal portion 26$v$ has a constant length in the width direction and the vertical direction. The leg connecting portion 26 has a curved portion 26$h$ that connects the upper end portions of the pair of longitudinal portions 26$v$ with an arcuate curve.

The central portion of the curved portion 26$h$ is located slightly lower than the lower end portion of the shaft portion 22.

A connecting portion thick portion 26$f$ having a circular cross section is formed between each longitudinal portion 26$v$ and curved portion 26$h$.

The connecting portion thick portion 26$f$ extends in the width direction. When the clip 10 is pulled out from the mounting hole 52 of the mount receiving member 50, the connecting portion thick portion 26 abuts the lower portion of the leg portion 24, and the lower portion of the clip 10 is regulated so as not to be easily bent inward.

In addition, the lower portions of the longitudinal portions 26$v$ of the leg connecting portions 26 are brought into contact with each other, and the lower portion of the clip 10 is regulated so as not to be easily bent inward.

We shall now describe when the clip 10 is mounted to the mounting hole 52 punched and perforated in the mount receiving member 50 from the opposite side of the punched side.

A mounting member (not shown) is mounted between the head 11 and the mounting flange 13.

Figure 10:
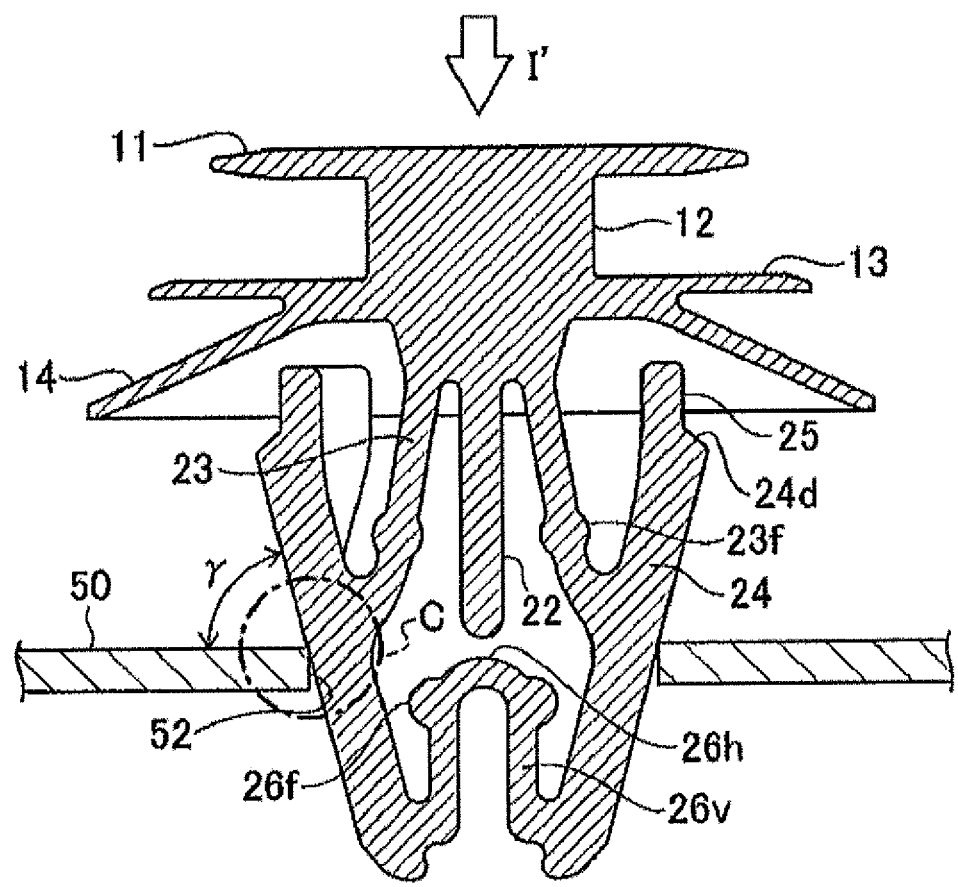
FIG. 10 is a cross-sectional view taken along line A-A in FIG. 7 at the stage where the clip is inserted into the mounting hole of the mount receiving member.
Figure 11:
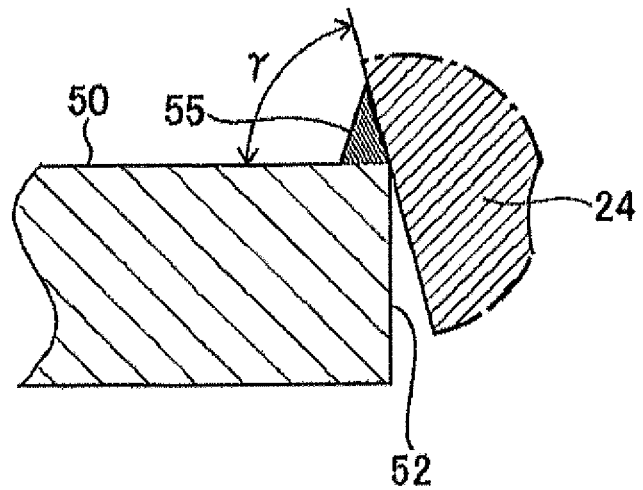
FIG. 11 is an enlarged view of the C portion of FIG. 10.
Figure 12:
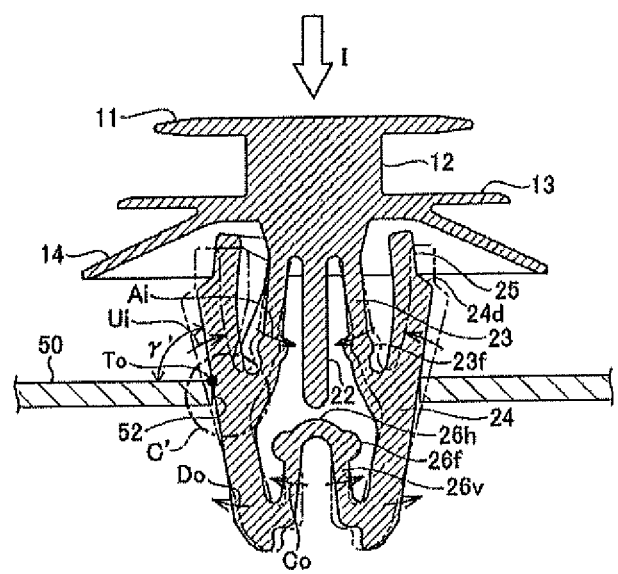
FIG. 12 is a cross-sectional view of the stage wherein the clip from the stage of FIG. 10 is further inserted.
Figure 13:
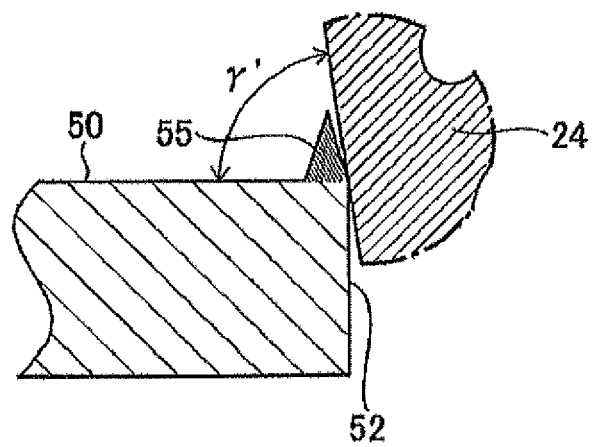
FIG. 13 is an enlarged view of the C' portion of FIG. 12.
Figure 14:
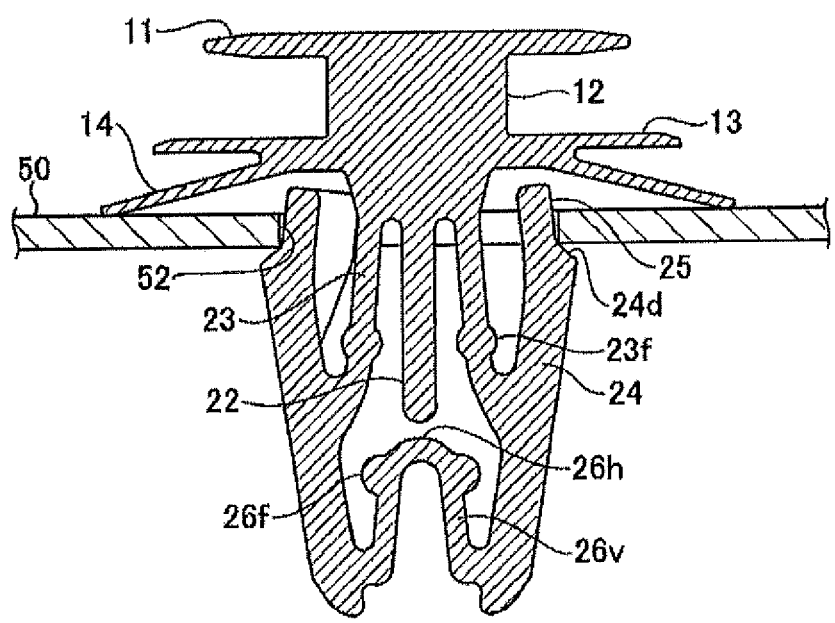
FIG. 14 is a cross-sectional view of the stage where clip mounting is completed.

FIG. 10 is a cross-sectional view taken along line A-A of FIG. 7 at the stage of inserting the clip 10 into the mounting hole 52 of the mount receiving member 50. FIG. 11 is an enlarged view of the C portion of FIG. 10. FIG. 12 is a cross-sectional view of the stage of further inserting the clip from the stage of FIG. 10. FIG. 13 is an enlarged view of the C' portion in FIG. 12. FIG. 14 is a cross-sectional view of the stage wherein mounting of the clip 10 is completed.

With reference to FIG. 10, first, the head portion 11 of the clip 10 is pressed as indicated by the arrow I', and the leg portion 24 of the clip 10 is inserted into the mounting hole 52 of the mount receiving member 50. The outer surfaces of the pair of leg portions 24 of the clip 10 come into contact with the upper edge portion of the inner surface of the mounting hole 52 of the mount receiving member 50 and stop. The outer diameter at the position where the leg portion 24 of the clip 10 abuts is substantially equal to the inner diameter of the mounting hole 52 of the mount receiving member 50.

FIG. 11 is an enlarged view of the C portion of FIG. 10. Since the mounting hole 52 of the mount receiving member 50 is punched from the lower side, a burr 55 extends upward around the mounting hole 52. The leg portions 24 of the clip 10 are inclined so as to spread upward. The angle formed between the upper surface of the mount receiving member 50 and the outer surface of the leg portions 24 is γ, which is smaller than 90°. The outer surfaces of the leg portions 24 tend to come into contact with the burr 55.

FIG. 12 shows the stage in which the head portion 11 of the clip 10 is pushed downward from the stage of FIG. 10. The shape of the clip 10 in the stage of FIG. 10 is indicated by a dashed-dotted chain line. As shown by the arrow I, the head portion 11 of the clip 10 is pushed downward.

The upper portions of the pair of leg portions 24 receive an inward force as indicated by the arrow Ui and move inward so as to approach each other by the mounting holes 52 of the mount receiving member 50.

The arm portions 23 are pushed by the leg portions 24, receive an inward force as indicated by the arrow Ai, and move inward so as to approach each other.

The lower portions of the pair of leg portions 24 are subjected to outward forces as indicated by the arrow Do and move outward away from each other. With the movement of the lower portion of the leg portions 24, the longitudinal portions 26$v$ of the pair of leg connecting portions 26 receive an outward force as indicated by the arrow Co and move outward so as to move away from each other. Since the upper portions of the pair of leg portions 24 draw close together, while the lower portions spread apart, the pushing force required to push the clip 10 downward is a stable, low load.

As the clip 10 is pushed downward, the position (contact point To) at which the pair of leg portions 24 contact the upper edge portion of the mounting hole 52 of the mount receiving member 50 gradually moves to the upper side of the leg portions 24. As described above, the pair of leg portions 24 move inward so as to approach the upper portion and move outward so as to move farther away at the lower portion, with the position where the pair of leg portions 24 contact the upper edge portion of the mounting hole 52 serving as the boundary.

FIG. 13 is an enlarged view of the C' portion in FIG. 12. A burr 55 appears in the upward direction around the mounting hole 52 of the mount receiving member 50. Since the upper portions of the leg portions 24 are pushed inward, the angle γ' formed by the upper surface of the mount receiving member 50 and the outer surface of the leg portions 24 is larger than γ, and approaches 90°. Therefore, as compared with the state shown in FIG. 11, the outer surface of the leg portions 24 is less likely to come into contact with the burr 55.

From the step of FIG. 12, the head portion 11 of the clip 10 is pushed further downward. The upper portions of the pair of leg portions 24 further move inward, and the locking stepped portion 24$d$ of the leg portions 24 enters the inside of the mounting hole 52. FIG. 14 is a cross-sectional view showing the stage at which mounting of the clip 10 is completed. The locking stepped portion 24$d$ of the pair of leg portions 24 protrudes to the lower side of the mounting hole 52 of the mount receiving member 50 and moves to the outside, while the pair of locking portions 25 are inserted inside the mounting hole 52. The outer diameter of the locking portion 25 is adapted to the inner diameter of the mounting hole 52.

The umbrella-shaped flange 14 is pushed upward by the upper surface of the mount receiving member 50 and is bent. The mount receiving member 50 is sandwiched between the lower surface of the outer peripheral portion of the umbrella shaped flange 14 and the locking stepped portion 24d of the leg portions 24, and the mounting of the clip 10 is completed. The lower portions of the pair of leg portions 24 are moved outward to the extent similar to the stage of FIG. 12.

In the stage of FIG. 14, since the locking stepped portion 24d of the leg portions 24 is engaged with the periphery of the mounting hole 52 of the mount receiving member 50, the clip 10 cannot be easily removed.

Figure 15:
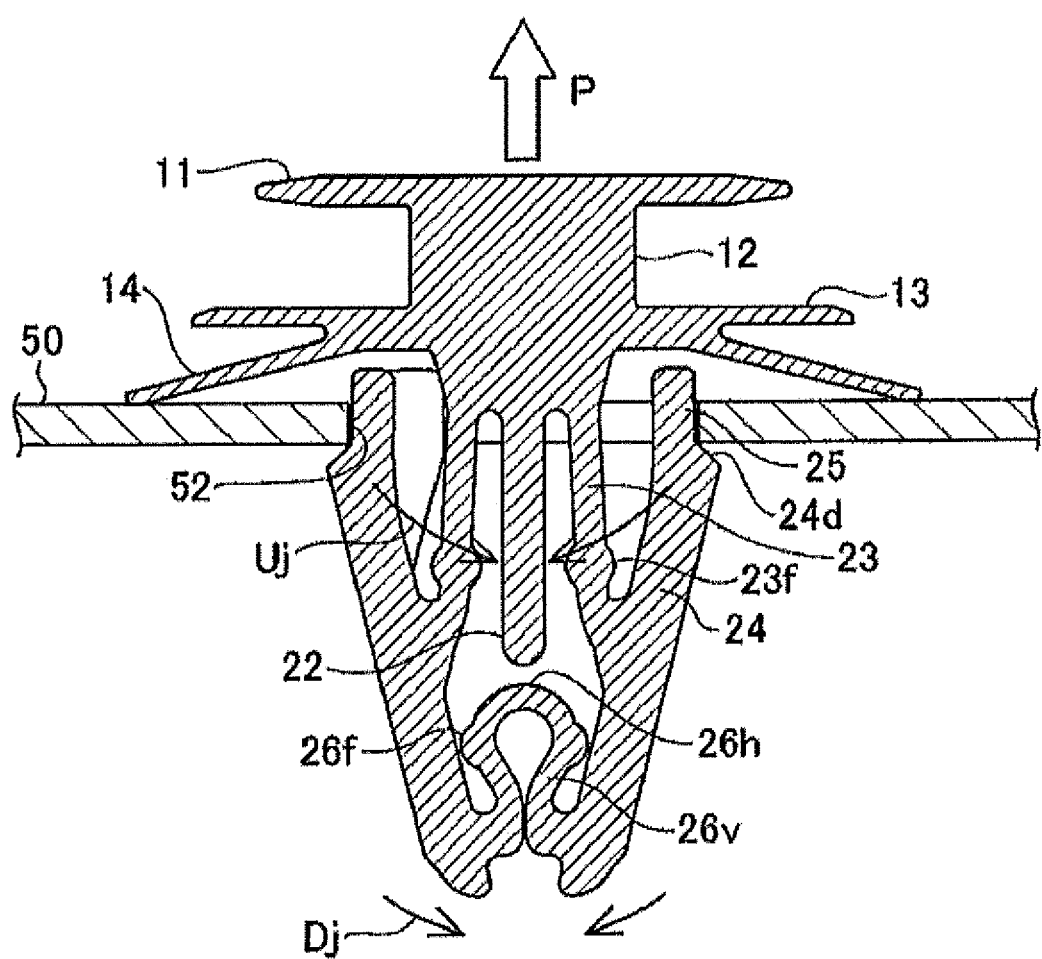
FIG. 15 is a cross-sectional view of the stage wherein the clip is removed from the mounting hole of the mount receiving member.

We shall now describe the procedure for removing the clip 10 from the stage of FIG. 14. FIG. 15 is a cross-sectional view of an intermediate stage of removing the clip 10. When the legs 24 of the clip 10 on the back side of the mount receiving member 50 are accessible, the entire pair of legs 24 are pressed inward from both sides. The upper portion of the leg portions 24 is pressed and moves inward. The pair of arm portions 23 are pressed by the leg portions 24 and move inward.

The lower portion of the leg portions 24 is pressed and moves inward. The pair of longitudinal portions 26v of the leg connecting portion 26 do not move further inward when they come close to each other and come in contact with each other. At this time, the connecting portion thick portion 26f abuts the inside of the lower portion of the leg portions 24 so that the lower portion of the leg portions 24 does not move further inward. After the pair of longitudinal portions 26v of the leg connecting portion 26 come into contact with each other, the upper portions of the pair of leg portions 24 are further pressed and moved inward.

If the leg portions 24 of the clip 10 are on the back side of the mount receiving member 50 and cannot operate from the back side, it is also possible to remove the clip 10 by pulling the mounting member mounted between the head 11 and the mounting flange 13 hard so that the upper portion of the clip 10 is pulled upward in a forceful manner, as indicated by the arrow P. When the upper portion of the clip 10 is pulled strongly in an upward manner, an inwardly downward force Uj is applied to the upper portion of the leg portions 24. An inwardly directed force Dj is applied to the lower portion of the leg portions 24.

The lower portion of the leg portions 24 moves inward. The pair of longitudinal portions 26v of the leg connecting portion 26 do not move further inward when they come close to, or when they come in contact with, each other. At this time, the connecting portion thick portion 26f abuts the inside of the lower portion of the leg portions 24 so that the lower portion of the leg portions 24 does not move further inward. After the pair of longitudinal portions 26v of the leg connecting portion 26 are brought into contact with each other, the upper portion of the pair of leg portions 24 is further pressed and moved inward.

The pair of longitudinal portions 26v of the leg connecting portion 26 come into contact with each other, and the lower portion of the pair of leg portions 24 can no longer move further inward, so that the level of force required to remove the clip 10 is high.

Figure 16:
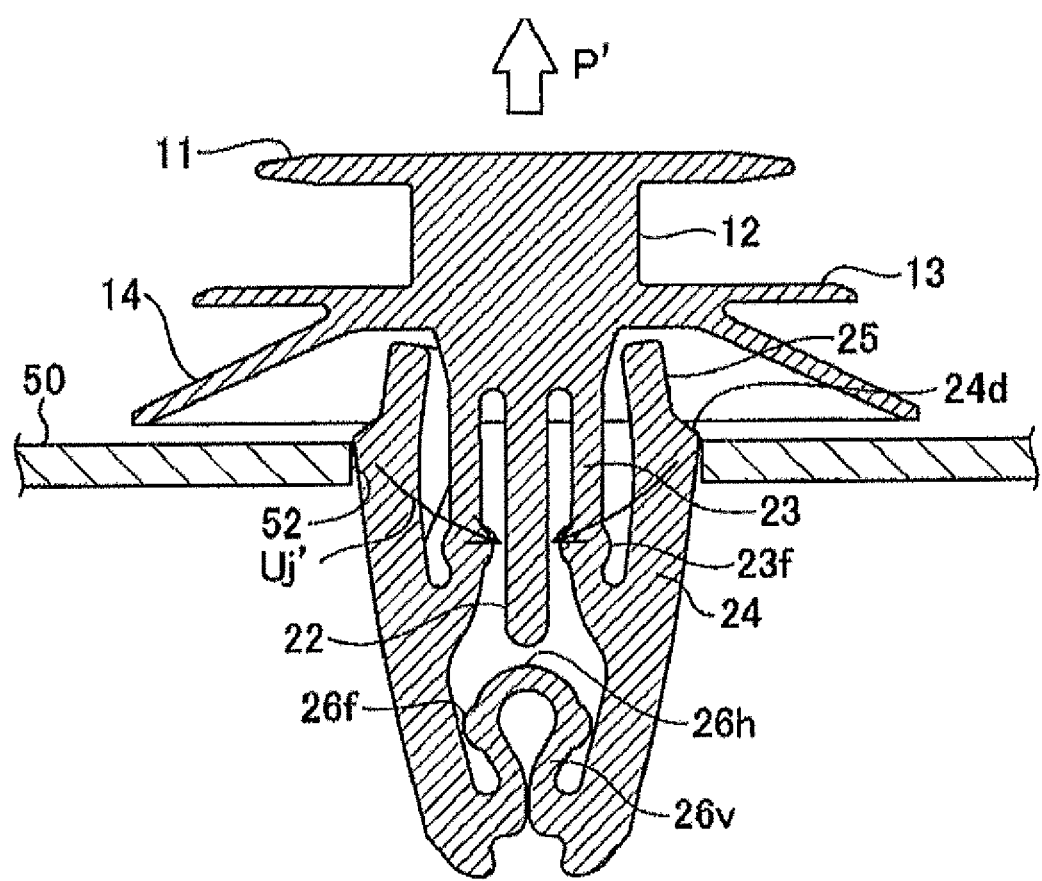
FIG. 16 is a cross-sectional view of the stage wherein the clip is further removed from the stage of FIG. 15.

FIG. 16 is a cross-sectional view of the stage in which the clip 10 is further pulled out. The locking stepped portion 24d of the leg portions 24 further moves inward and is inserted inside the mounting hole 52 of the mount receiving member 50. The locking portion 25 protrudes above the mounting hole 52.

When the locking stepped portion 24d of the leg portions 24 enters the inside the mounting hole 52 of the mount receiving member 50, the outer diameter of the leg portions 24 is reduced downward, so that the clip 10 can be easily pulled out with the force P'—which is smaller than the force P afterward. At this time, due to the inside of the mounting hole 52, the force Uj' applied to the upper portion of the leg portions 24 is smaller than the force Uj.

In the pair of leg portions of a conventional clip, the lower portion is thin while the upper portion is thick, and when pushing the leg portion into the mounting hole, the upper portion bends inward, with the lower portion acting as the fulcrum. The locking stepped portion of the leg portion engages with the lower surface of the mounting hole, and the clip is attached.

In the clip 10 according to the embodiment of the present invention, the leg portions 24 are supported at its intermediate portion, and when the leg portions 24 are pushed into the mounting hole 52, the upper portion of the leg portions 24 bends inward, and the lower portion bends outward. The angle of inclination of the outer surface of the leg portions 24 is close to 90° with respect to the surface of the mount receiving member 50, so that the leg portions 24 are less likely to come into contact with the burr 55, even if the burr 55 appears around the mounting holes 52 on the surface of the mount receiving member 50.

In a conventional clip, the leg portions are detached by forcefully pulling the clip upward.

In the clip 10 according to the embodiment of the present invention, when a great pulling force is applied to the clip upwardly, the pair of longitudinal portions 26v of the leg connecting portion 26 abut each other, and the lower portion of the leg portions 24 is prevented from moving further inward. The upper portion of the leg portions 24 must be sufficiently deflected, and the clip 10 must be pulled out. Therefore, the load required for removal of the clip 10 is great.

Like a conventional clip, the clip 10 according to the embodiment of the present invention can be easily mounted by merely pushing the leg portions 24 into the mounting hole 52 of the mount receiving member 50. Even if the clip 10 is mounted from the reverse punch side, it does not interfere with the burr 55, and it is possible to stably mount the clip 10. Also, the lower end portions of the leg portions 24 mutually support each other. Thereafter, the upper portion of the leg portions 24 deforms, with the lower end portion of the leg portions 24 acting as a fulcrum, so as to come out of the mounting hole 52. Therefore, even if the mounting and removal of the clip 10 are repeated, the decrease in removal load is small, and the clip 10 can be stably reused.

The clip 10 has an integral structure; in addition, it takes less time to assemble the parts, and there is no possibility that the parts will come off. When inserting the clip 10, the distal end portion of the arm portions 23 supports the intermediate portion of the leg portions 24 so that the upper portion of the leg portions 24 does not widen very much, and even with a burr 55, there is minimal interference with the upper portion of the leg portions 24. When pulling out the clip 10, it is possible to obtain a sufficient removal force by bringing the lower end portion of the leg portions 24 into contact and moving the upper portion of the leg portions 24 around the lower end portion acting as a fulcrum.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A clip for mounting a mounting member to a mount receiving member partially defining a mounting hole, the clip comprising:
    a member mounting portion by which the clip is connectable to the mounting member,
    an umbrella-shaped flange for pressing the mount receiving member,
    a pair of arm portions extending obliquely downward and outward from a central portion of the umbrella shaped flange,
    a pair of leg portions extending from distal end portions of the pair of arm portions upward and outward and downward and inward,
    a pair of locking stepped portions formed at upper end portions of the pair of leg portions; and
    a leg connecting portion connecting lower end portions of the pair of leg portions, and the leg connecting portion includes a pair of longitudinal portions and a curved portion joining upper end portions of the pair of longitudinal portions.

2. A clip according to claim 1, and further comprising a flat plate-shaped shaft portion extending downward from a central portion of the umbrella-shaped flange.

3. A clip according to claim 1, and wherein the leg connecting portion further includes a pair of thick portions thicker than the longitudinal portions and the curved portion, and each thick portion is located between a respective one of the pair of longitudinal portions and the curved portion.

4. A clip according to claim 1, and wherein each of the pair of arm portions includes a first thickness located at an intermediate portion of the respective arm portion and a second thickness, which is thinner than the first thickness, located in a proximal portion and the distal end portion of the respective arm portion.

5. A clip according to claim 1, wherein the member mounting portion includes a head portion; a neck portion positioned below the head portion and having an outer diameter smaller than the head portion; and a mounting flange positioned below the neck portion and having an outer diameter larger than the neck portion.

6. A mounting assembly, comprising:
    a mounting member;
    a mount receiving member defining a mounting through hole; and
    a clip including:
        a member mounting portion in which the mounting member is connected to the clip,
        an umbrella-shaped flange for pressing the mount receiving member,
        a pair of arm portions extending obliquely downward and outward from a central portion of the umbrella shaped flange,
        a pair of leg portions extending from an upper outer side to a lower inner side,
        a pair of locking stepped portions on upper end portions of the pair of leg portions;
        a leg connecting portion connecting lower end portions of the pair of leg portions, and the leg connecting portion includes a pair of longitudinal portions and a curved portion joining upper end portions of the pair of longitudinal portions; and
        wherein distal end portions of the pair of arm portions are respectively connected to intermediate portions of the pair of leg portions, and
    wherein the pair of locking stepped portions are positioned at a lower side edge portion of the mounting hole of the mount receiving member, and the mount receiving member is mounted between the outer peripheral portion of the umbrella shaped flange and the pair of locking stepped portions of the pair of leg portions.

7. A mounting assembly according to claim 6, wherein the clip further includes a shaft portion extending downward from the central portion of the umbrella shaped flange.

8. A mounting assembly according to claim 6, and wherein the leg connecting portion further includes a pair of thick portions thicker than the longitudinal portions and the curved portion, and each thick portion is located between a respective one of the pair of longitudinal portions and the curved portion.

9. A mounting assembly according to claim 6, and wherein each of the pair of arm portions includes a first thickness located at an intermediate portion of the respective arm portion and a second thickness, which is thinner than the first thickness, located in a proximal portion and the distal end portion of the respective arm portion.

10. A clip for mounting a mounting member to a mount receiving member partially defining a mounting hole, the clip comprising:
    a member mounting portion by which the clip is connectable to the mounting member,
    an umbrella-shaped flange for pressing the mount receiving member,
    a pair of arm portions extending obliquely downward and outward from a central portion of the umbrella shaped flange, and each of the pair of arm portions includes a first thickness located at an intermediate portion of the respective arm portion and a second thickness, which is thinner than the first thickness, located in a proximal portion and a distal end portion of the respective arm portion,
    a pair of leg portions extending from the distal end portions of the pair of arm portions upward and outward and downward and inward, and
    a pair of locking stepped portions formed at upper end portions of the pair of leg portions.

11. A clip according to claim 10, and further comprising a flat plate-shaped shaft portion extending downward from a central portion of the umbrella-shaped flange.

12. A clip according to claim 10, and further comprising a leg connecting portion connecting lower end portions of the pair of leg portions.

13. A clip according to claim 12, and wherein the leg connecting portion includes a pair of longitudinal portions and a curved portion joining upper end portions of the pair of longitudinal portions.

14. A clip according to claim 13, and wherein the leg connecting portion further includes a pair of thick portions thicker than the longitudinal portions and the curved portion, and each thick portion is located between a respective one of the pair of longitudinal portions and the curved portion.

15. A clip according to claim 10, wherein the member mounting portion includes a head portion; a neck portion positioned below the head portion and having an outer diameter smaller than the head portion; and a mounting flange positioned below the neck portion and having an outer diameter larger than the neck portion.

* * * * *